US012800913B2

(12) United States Patent
Dhandhania et al.

(10) Patent No.: US 12,800,913 B2
(45) Date of Patent: Nov. 17, 2026

(54) ELECTRONIC DEVICES WITH STRETCHABLE FABRIC COVERS

(71) Applicant: Apple Inc., Cupertino, CA (US)

(72) Inventors: Vedant A Dhandhania, San Jose, CA (US); Yiwei Tao, Campbell, CA (US); Edward W Wong, San Jose, CA (US)

( * ) Notice: Subject to any disclaimer, the term of this patent is extended or adjusted under 35 U.S.C. 154(b) by 236 days.

(21) Appl. No.: 18/678,486

(22) Filed: May 30, 2024

(65) Prior Publication Data

US 2024/0319495 A1 Sep. 26, 2024

Related U.S. Application Data

(63) Continuation of application No. PCT/US2022/052656, filed on Dec. 13, 2022.

(60) Provisional application No. 63/292,997, filed on Dec. 22, 2021.

(51) Int. Cl.
*G02B 27/00* (2006.01)
*G02B 30/00* (2020.01)

(52) U.S. Cl.
CPC ......... *G02B 27/0006* (2013.01); *G02B 30/00* (2020.01)

(58) Field of Classification Search
CPC ..... G02B 27/0006; G02B 30/00; D04B 21/12
See application file for complete search history.

(56) References Cited

U.S. PATENT DOCUMENTS

| | | | | |
|---|---|---|---|---|
| 10,591,736 | B1 | 3/2020 | Bristol et al. | |
| 11,812,831 | B1 * | 11/2023 | Leith | B32B 5/2795 |
| 2018/0095498 | A1 * | 4/2018 | Raffle | G06K 7/10297 |
| 2021/0325631 | A1 | 10/2021 | Tao et al. | |
| 2021/0325678 | A1 | 10/2021 | Maric et al. | |

FOREIGN PATENT DOCUMENTS

| | | | |
|---|---|---|---|
| GB | 1244222 | A | 8/1971 |
| JP | 2003013345 | A | 1/2003 |
| JP | 4331079 | B2 | 9/2009 |
| KR | 20180030146 | A | 3/2018 |
| WO | 2017068563 | A1 | 4/2017 |

* cited by examiner

*Primary Examiner* — James A Dudek

(74) *Attorney, Agent, or Firm* — Treyz Law Group, P.C.; Kendall P. Woodruff

(57) ABSTRACT

Electronic devices such as head-mounted electronic devices may include displays for presenting images to users. To accommodate variations in the interpupillary distances associated with different users, a head-mounted device may have left-eye and right-eye optical modules that move with respect to each other. To hide internal structures from view, the rear of a head-mounted device may be provided with a stretchable fabric cover with openings for receiving optical modules. The fabric cover may have first strands forming a warp knit layer with diamond-shaped openings and second strands that zig-zag back and forth within the diamond-shaped openings. The first strands may stretch in the warp direction, while the second strands may stretch in the weft direction. The second strands may have a fuzzy covering for hiding electrical components even as the diamond-shaped openings expand when the fabric is stretched.

18 Claims, 6 Drawing Sheets

ELECTRONIC DEVICES WITH STRETCHABLE FABRIC COVERS

This application is a continuation of international patent application No. PCT/US2022/052656, filed Dec. 13, 2022, which claims priority to U.S. provisional patent application No. 63/292,997, filed Dec. 22, 2021, which are hereby incorporated by reference herein in their entireties.

FIELD

This relates generally to electronic devices, and, more particularly, to wearable electronic devices such as head-mounted devices.

BACKGROUND

Electronic devices such as head-mounted devices are configured to be worn on a head of a user. A head-mounted device may have left and right optical systems for presenting images to a user's left and right eyes. Not all users have the same physical distance separating their eyes. To accommodate differences in interpupillary distance between different users, a head-mounted device may have a mechanism for adjusting the positions of the left and right optical systems.

SUMMARY

Electronic devices such as head-mounted electronic devices may include displays for presenting images to users. To accommodate variations in the interpupillary distances associated with different users, a head-mounted device may have left-eye and right-eye optical modules that move with respect to each other. Each optical module may include a display device for producing an image and an associated optical component such as a lens for providing the image to an associated eye box in which an eye of the user is located for viewing the image. The optical modules, which may sometimes be referred to as optical systems, display systems, lens systems, lens and display assemblies, etc., may each have a support structure such as a lens barrel that supports a respective display and lens.

Actuators may be used to position the lens barrels within the housing of a head-mounted device. To hide the actuators and other electrical components such as integrated circuits, batteries, sensors, etc. and to hide potentially unsightly internal housing structures from view, the rear of a head-mounted device that faces the user may be provided with a cosmetic covering. Openings in the cosmetic covering may receive the lens barrels of the optical modules. The cosmetic covering may be configured to accommodate movement in the positions of the optical modules for different interpupillary distances.

The covering may be a stretchable fabric cover having first strands that form a warp knit layer with diamond-shaped openings and second strands that zig-zag back and forth within the diamond-shaped openings. The first strands may be elastic and may provide stretch in the warp direction, while the second strands may be covered strands that provide stretch in the weft direction. The covered strands may have a drawn textured yarn covering that forms a fuzzy and opaque layer for hiding electrical components.

If desired, the cover may be a jacquard fabric with different zones of stretch, opacity, and/or other characteristics. For example, the cover may have a nose bridge region interposed between eye regions. The nose bridge region may have greater opacity and less stretch than the eye regions.

Arrangements in which the cover is formed from three-dimensional fabric having cylindrical portions that move relative to one another in response to optical module movements may also be used.

DETAILED DESCRIPTION

An electronic device such as a head-mounted device may have a front face that faces away from a user's head and may have an opposing rear face that faces the user's head. Optical modules on the rear face may be used to provide images to a user's eyes. The positions of the optical modules may be adjusted to accommodate different user interpupillary distances. Internal device structures may be hidden from view by the user by covering the rear face of the device with a curtain. The curtain, which may sometimes be referred to as a cover, covering structure, rear housing cover, rear housing wall, rear housing structure, cosmetic covering, etc., may help block potentially unsightly internal structures from view, while accommodating movement of the optical modules.

Figure 1:
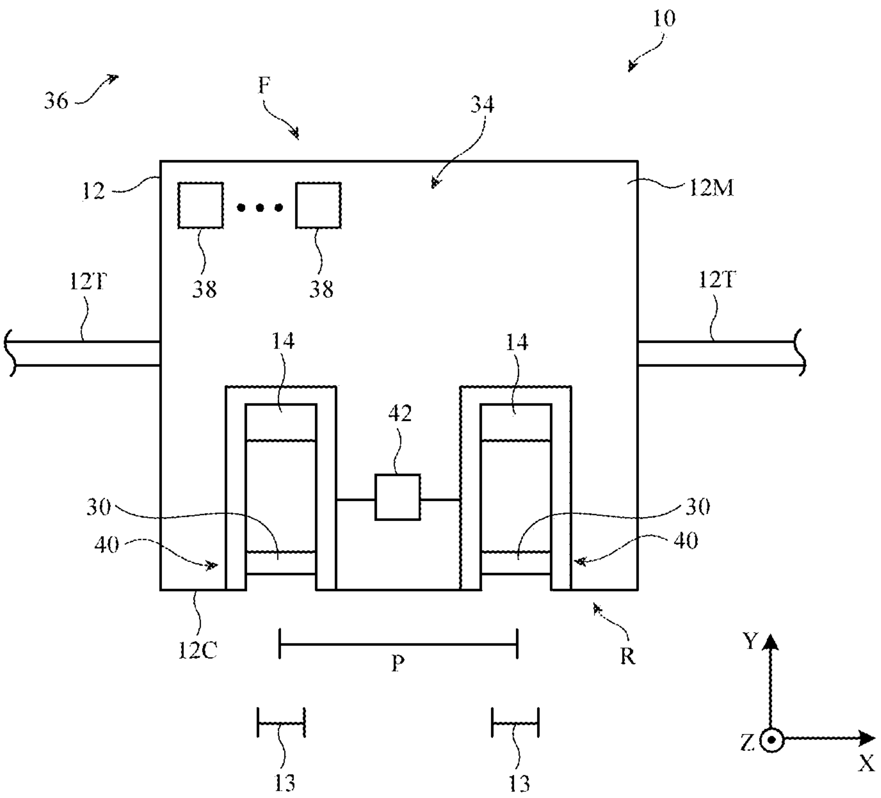
FIG. 1 is a top view of an illustrative head-mounted device in accordance with an embodiment.

A top view of an illustrative head-mounted device with a curtain is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T may be formed from fabric, polymer, metal, and/or other material. Support structures 12T may form a strap or other head-mounted support structures that help support device 10 on a user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as curtain 12C. In an illustrative configuration, curtain 12C includes a fabric layer that separates interior region 34 from the exterior region to the rear of device 10. Other structures may be used in forming curtain 12C, if desired. The presence of curtain 12C on rear face R may help hide internal housing structures, internal components 38, and other structures in interior region 34 from view by a user.

Device 10 may have left and right optical modules 40 (sometimes referred to as optical assemblies). Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30. Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images. Lenses 30 may include one or more lens elements for providing image light from displays 14 to respective eyes boxes 13. Lenses may be implemented using refractive glass lens elements, using mirror lens structures (catadioptric lenses), using holographic lenses, and/or other lens systems. When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

Not all users have the same interpupillary distance P. To provide device 10 with the ability to adjust the interpupillary spacing between modules 40 along lateral dimension X and thereby adjust the spacing P between eye boxes 13 to accommodate different user interpupillary distances, device 10 may be provided with actuators 42. Actuators 42 can be manually controlled and/or computer-controlled actuators (e.g., computer-controlled motors) for moving support structures 32 relative to each other.

Figure 2:
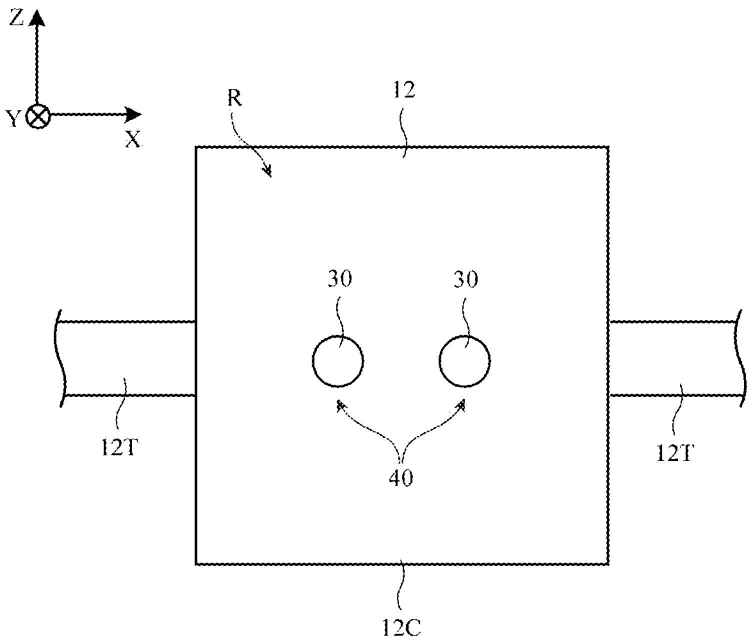
FIG. 2 is a rear view of an illustrative head-mounted device in accordance with an embodiment.

As shown in FIG. 2, curtain 12C may cover rear face R while leaving lenses 30 of optical modules 40 uncovered (e.g., curtain 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other. To prevent undesired wrinkling and buckling of curtain 12C as optical modules 40 are moved relative to rigid portions of housing 12M and relative to each other, a fabric layer or other cover layer in curtain 12C may be configured to slide, stretch, open/close, and/or otherwise adjust to accommodate optical module movement.

Figure 3:
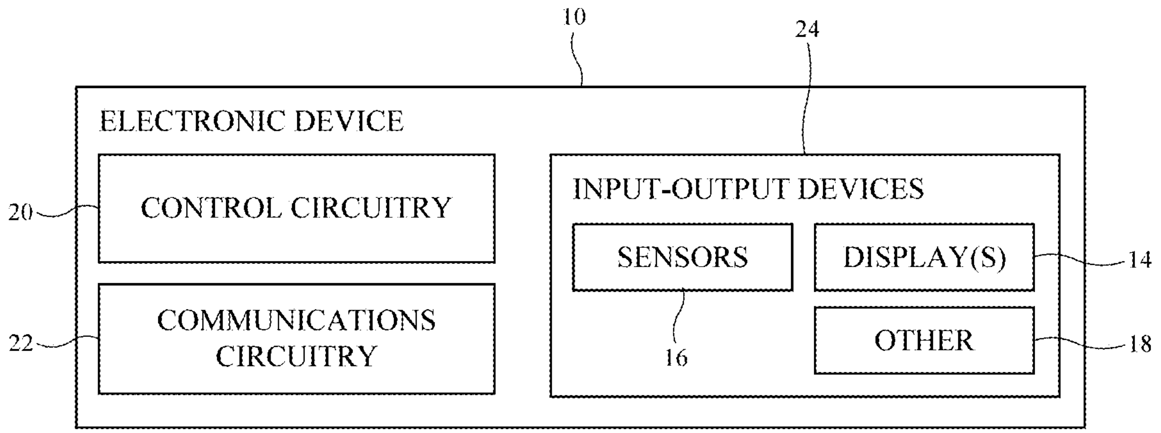
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
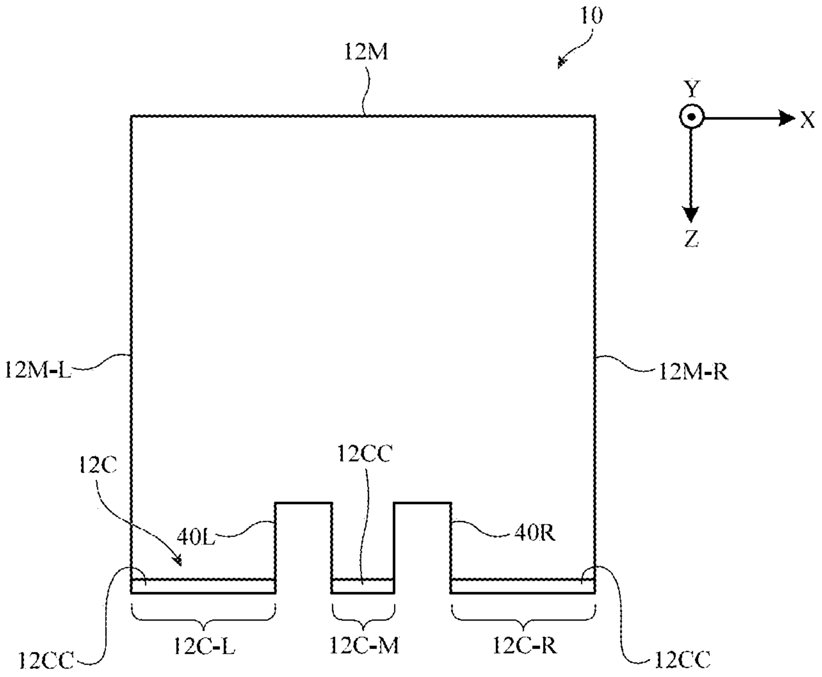
FIG. 4 is a top view of an illustrative head-mounted device in which left-eye and right-eye optical modules have been placed close to each other to accommodate a user with a small interpupillary distance in accordance with an embodiment.
Figure 5:
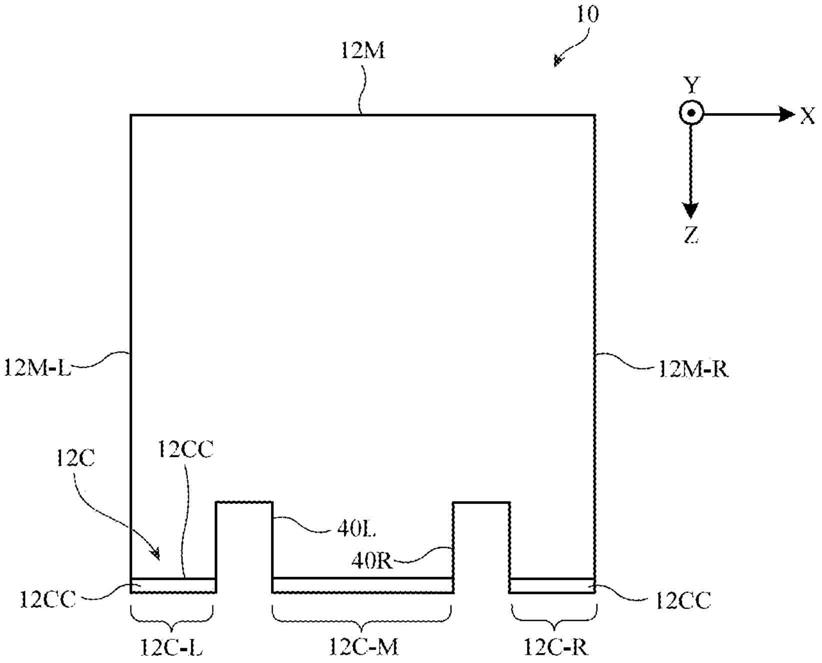
FIG. 5 is a top view of the illustrative head-mounted device of FIG. 4 in which the optical modules have been moved away from each other to accommodate a user with a large interpupillary distance in accordance with an embodiment.

FIGS. 4 and 5 are top views of device 10 showing how the optical modules of device 10 move with respect to each other along lateral dimension X to accommodate different interpupillary distances P (the distance between a user's left and right eyes). In the example of FIG. 4, left optical module 40L and right optical module 40R have been moved towards each other to accommodate a small interpupillary distance. In the example of FIG. 5, left optical module 40L and right optical module 40R have been moved away from each other to accommodate a large interpupillary distance.

Curtain 12C has edge portions such as left portion 12C-L between left housing wall 12M-L and left optical module 40L and right portion 12C-R between right housing wall 12M-R and right optical module 40R. Middle portion 12C-M of curtain 12C extends between left optical module 40L and right optical module 40R. In the configuration of FIG. 4, optical modules 40L and 40R are relatively close to each other, so middle portion 12C-M is relatively small and portions 12C-L and 12C-R are relatively large. In the configuration of FIG. 5, optical modules 40L and 40R are relatively far from each other, so left portion 12C-L and right portion 12C-R are shorter along lateral dimension X and middle portion 12C-M has been enlarged relative to the configuration of FIG. 4.

To help accommodate differences in size for curtain 12C (e.g., length changes for portions of curtain 12C along lateral dimension X), curtain 12C may include a cover layer such as cover layer 12CC formed from a stretchable material such as fabric. Cover layer 12CC may be supported by a rigid frame. The fabric of cover layer 12CC may be provided with a peripheral elastic band that helps allow the fabric to slide relative to the frame while being retained securely on the frame, thereby further helping curtain 12C to be dynamically adjusted without exhibiting undesired buckling and wrinkling. Cover layer 12CC may have left and right openings to receive respective left and right optical modules 40L and 40R.

Cover layer 12CC may be formed from fabric having the desired opacity (e.g., sufficiently opaque to hide electronic components in device 10), stretch (e.g., cover 12CC may be configured to stretch by at least 50%, at least 75%, at least 100%, or at least 150% of its length to allow dynamic expansion and contraction of cover 12CC as optical modules 40L and 40R are adjusted, as an example), modulus of elasticity (e.g., the elastic modulus of cover 12CC may be sufficiently low so that less electrical power is required for actuators 42 to stretch cover 12CC), durability (e.g., cover 12CC may be configured to maintain dimensional stability over long term use by avoiding wrinkling after being exposed to skin sebum and/or other chemicals, repeated stretching, etc.), cosmetic appeal, and/or other suitable characteristics.

Figure 6:
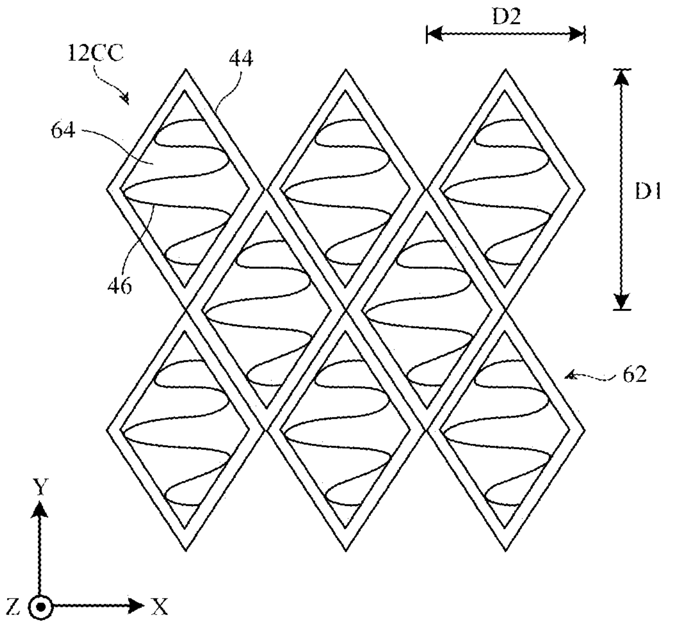
FIG. 6 is a front view of an illustrative cover layer with stretchable fabric in an unstretched state in accordance with an embodiment.

FIG. 6 is a front view of an illustrative cover layer for curtain 12C. As shown in FIG. 6, cover layer 12CC may include fabric formed from fabric such as fabric 62. Fabric 62 may be warp knit fabric, weft knit fabric, or other knit fabric (e.g., to promote stretchiness), may be woven fabric, braided fabric, non-woven fabric, etc. If desired, a layer of stretchy plastic may be attached to fabric 62 and/or an elastomeric polymer layer may be used in place of some or all of fabric 62 in forming layer 12CC. Fabric 62 may be formed from interlaced (intertwined) strands of material such as polymer strands, strands of cotton or other natural material, synthetic material, and/or other materials. The strands in fabric 62 may include monofilament strands and/or multi-filament strands. In an illustrative configuration, some of the strands of fabric 62 may be selected to provide fabric 62 with strength, some of strands in fabric 62 may be formed from elastomeric material that enhances the ability of fabric 62 to stretch (and that has a lower elastic modulus than the strands that provide fabric 62 with strength). Examples of stretchable strand materials include elastomeric materials such as silicone, spandex, and thermoplastic polyurethane (TPU). Examples of strength-enhancing strand materials include polyester, nylon, etc. Other materials may be used in forming the strands in fabric 62, if desired.

Strands in fabric 62 may be dyed at the fabric level (e.g., after strands are knit, woven, or otherwise interlaced to form fabric 62), may be dyed at the strand or yarn level (e.g., after material is made into monofilament or multifilament strands), and/or may be dyed at the polymerization level (e.g., before material is made into monofilament or multi-filament strands). Dyeing yarn may cause some shrinkage and should therefore be taken into account when determining the appropriate amount of stretch for fabric 62.

In the example of FIG. 6, fabric 62 includes warp knit strands 44 and zig-zag strands 46. Warp knit strands 44 may be warp knit strands that form a pattern of openings such as diamond-shaped openings 64. If desired, openings 64 may have other shapes. The use of diamond shapes for openings 64 is merely illustrative. Warp knit strands 44 may be formed from stretchable materials such as silicone, spandex, thermoplastic polyurethane (TPU), and or other stretchable materials, or warp strands 44 may be formed from strength-enhancing strand materials such as polyester, nylon, etc. Other materials may be used in forming strands 44, if desired.

Zig-zag strands 46 may be interlaced with warp knit strands 44 and may zig-zag back and forth (e.g., back in forth in the weft or x-direction) multiple times within each diamond-shaped opening 64. Zig-zag strands 46 (sometimes referred to as running strands, accordion strands, etc.) may be formed from stretchable materials such as silicone, spandex, thermoplastic polyurethane (TPU), and or other stretchable materials, or zig-zag strands 46 may be formed from strength-enhancing strand materials such as polyester, nylon, etc. Other materials may be used in forming strands 46, if desired. Strands 46, may, if desired, be covered strands that include a covering. The covering may be a different material than the core. For example, the core may be a stretchable material such as spandex and the covering may be a less-stretchable material such as polyester or polyethylene terephthalate. If desired, the covering may be relatively "fuzzy" (e.g., may have a frayed or otherwise not smooth texture) to increase opacity of cover 12CC.

In some arrangements, warp knits strands 44 and zig-zag strands 46 are formed in the same layer (e.g., formed in single layer). In other arrangements, warp knit strands 44 may be formed in front of or behind zig-zag strands 46 (e.g., warp knit strands 44 may be formed in a first layer and zig-zag strands 46 may be formed in a second layer that overlaps the first layer). In one illustrative arrangement, zig-zag strands 46 are positioned on the side closer to the user's face and warp strands 44 are positioned on the side closer to the electrical components in device 10. In configurations where zig-zag strands 46 include a covering (e.g., a covering of polyester, polyethylene terephthalate, and/or other suitable material), placing zig-zag strands 46 on the user-facing side of cover 12CC may help protect the stretchable strands in fabric 62 (e.g., strands 44 and/or the core of strands 46) from facial chemicals such as sebum that may otherwise cause wear to elastic strands in fabric 62. If desired, warp knit strands 44 may be smooth strands and zig-zag strands 46 may be textured fuzzy strands.

Figure 7:
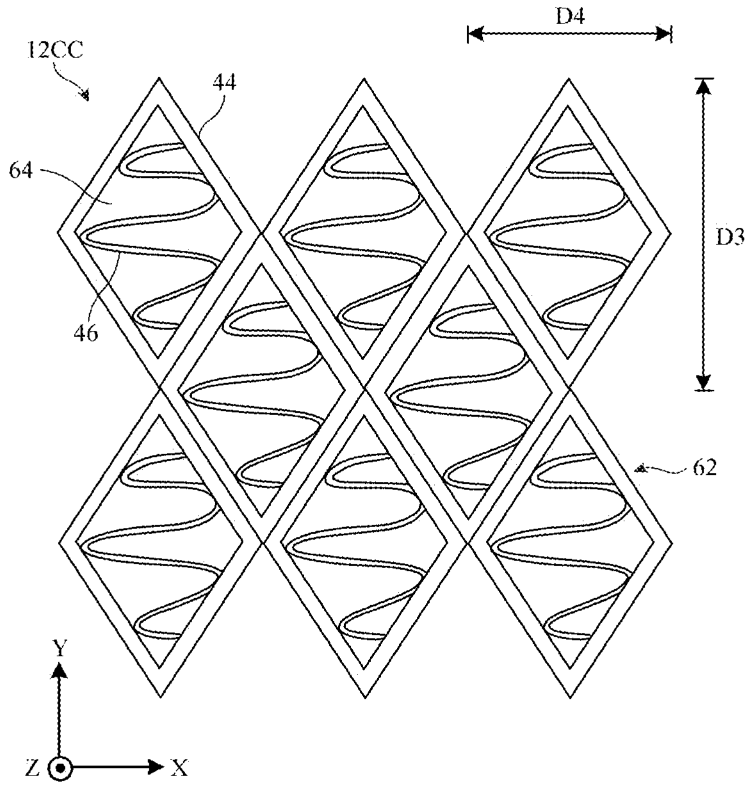
FIG. 7 is a front view of the illustrative cover layer of FIG. 6 with stretchable fabric in a stretched state in accordance with an embodiment.

The use of warp knit strands 44 and zig-zag strands 46 may provide cover 12CC with different features. For example, warp knit strands 44 extend in the warp direction, thereby promoting shrinkage and increasing stretch in the warp direction. In contrast, zig-zag strands 46 may zig-zag in the weft direction, thereby promoting shrinkage and increasing stretch in the weft direction. For example, when fabric 62 is in an unstretched state, each diamond-shaped opening 64 has dimension D1 in the vertical (warp) direction (e.g., parallel to the y-axis of FIG. 6) and dimension D2 in the horizontal (weft) direction (e.g., parallel to the x-axis of FIG. 6). When fabric 62 is in a stretched state, as shown in FIG. 7, each diamond-shaped opening 64 has dimension D3 in the vertical (warp) direction (e.g., parallel to the y-axis of FIG. 7) and dimension D4 in the horizontal (weft) direction (e.g., parallel to the x-axis of FIG. 7). Dimension D3 may be larger than dimension D1, and dimension D4 may be larger than dimension D2. In other words, openings 64 may open and expand when cover 12CC is stretched. Warp knit strands 44 stretch in the warp direction, thereby allowing the opening and closing of openings 64, whereas zig-zag strands 44 stretch in the weft direction, thereby providing fabric 62 with four-way stretch capabilities. The opacity provided by the fuzzy covering on zig-zag strands 46 may also serve to hide electrical components from view when openings 64 are expanded.

Another factor that may affect the stretchability of fabric 62 of cover 12CC is heat setting. In arrangements where fabric 62 is heat set, fabric 62 may be stretched and heat set to remove wrinkles. This may, however, reduce some of the stretch in fabric 62. If desired, fabric 62 of cover 12CC may be produced without any heat setting (e.g., may only undergo washing, dyeing, and drying) to retain the desired stretchability of fabric 62.

Figure 8:
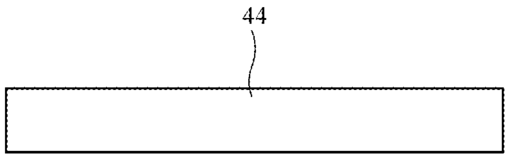
FIG. 8 is a side view of an illustrative first strand that may be used in a cover layer of the type shown in FIGS. 6 and 7 in accordance with an embodiment.

FIG. 8 is a side view of an illustrative strand 44 that may be used to form warp knit strands 44 of fabric 62. In the example of FIG. 8, strand 44 may be a single strand of material such as spandex, silicone, thermoplastic polyurethane (TPU), and/or other stretchable material, or strand 44 may be a single strand of strength-enhancing strand materials such as polyester, nylon, etc. In one illustrative configuration, strand 44 is a single strand of spandex having 20 denier, 40 denier, 30 denier, between 15 and 60 denier, between 20 and 50 denier, greater than 40 denier, less than 40 denier, etc. This is merely illustrative. If desired, strand 44 may be formed from other suitable materials and/or may have other denier values.

Figure 9:
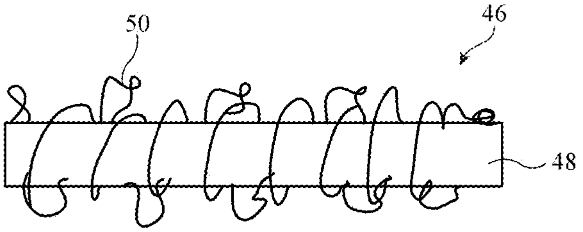
FIG. 9 is a side view of an illustrative second strand that may be used in a cover layer of the type shown in FIGS. 6 and 7 in accordance with an embodiment.

FIG. 9 is a side view of an illustrative strand 46 that may be used to form zig-zag strands 46 of fabric 62. In the example of FIG. 9, strand 46 may include a core such as core 48. Core 48 may be an elastic core formed from one or more strands of material such as spandex, silicone, thermoplastic polyurethane (TPU), and/or other stretchable material, or core 48 may be one or more strands of strength-enhancing strand materials such as polyester, nylon, etc. In one illustrative configuration, core 48 is an elastic core formed from a single strand of spandex having 20 denier, 40 denier, 30 denier, between 15 and 60 denier, between 20 and 50 denier, greater than 40 denier, less than 40 denier, etc. The denier value of core 48 of zig-zag strand 46 may, for example, be less than the denier value of warp knit strands 44. This is merely illustrative. If desired, strand 46 may be formed from other suitable materials and/or may have other denier values.

A shown in FIG. 9, core 48 of strand 46 may be covered with one or more covering strands 50. Covering strands 50 may be formed from strength-enhancing strand materials such as polyester, nylon, etc., or covering strands 50 may be formed from elastic material such as spandex, silicone, thermoplastic polyurethane (TPU), and/or other stretchable material. Cover 50 may have any suitable denier value such as 30 denier, 20 denier, 40 denier, between 15 and 60 denier, between 20 and 50 denier, greater than 40 denier, less than 40 denier, etc. The denier value of cover 50 of zig-zag strand 46 may, for example, be greater than the denier value of core 48 of strands 46. Covering strand 50 may be a single filament covering or may include multiple filaments such as 24 filaments, 30 filaments, 20 filaments, more than 20 filaments, less than 20 filaments, etc. Covering strand 50 may be textured, non-textured, bright, semi-dull, etc. In one illustrative configuration, covering strand 50 is a drawn textured yarn of polyester that is simultaneously twisted and drawn to provide a textured, fuzzy covering over core 48. Because polyester is less sensitive to facial chemicals such as sebum than spandex, covering core 48 with a fuzzy yarn such as strand 50 ensures that most of the surface facing the user is polyester and thus more durable throughout continued use. The use of drawn textured yarn for covering 50 may also increase the opacity of cover 12CC to help hide electronic components even when cover 12CC and curtain 12C are stretched and openings 64 expand.

If desired, covering strand 50 may be formed from a conductive material. Using conductive strands for covering 50 may provide a conductive layer on fabric 62 in which conductive covering strands 50 are in contact with one another across the surface of the fabric. In other configurations, strand 46 may be a polycarbonate or braided cord with an electrically conductive core. Arrangements in which strand 46 includes a multi-component yarn with different polymers joined together within each filament may also be used. When exposed to heat, the different polymers may shrink to different degrees, thereby producing a smooth helical crimp. This may provide strands 46 with texture while still allowing strands 46 to maintain durable stretch and recovery.

Figure 10:
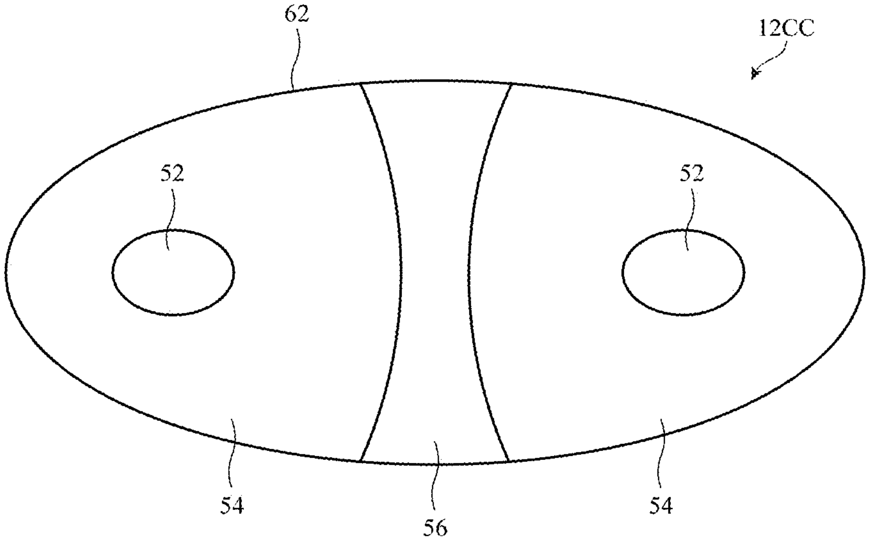
FIG. 10 is a front view of an illustrative cover layer having regions with different levels of stretch and opacity in accordance with an embodiment.

If desired, cover 12CC may have regions with different levels of stretch, opacity, and/or other characteristics. This type of arrangement is illustrated in FIG. 10. As shown in FIG. 10, cover 12CC may have regions with different fabric characteristics such as eye regions 54 and nose region 56. Eye regions 54 may surround left and right openings such as lens barrel openings 52 for receiving respective left and right lenses 30 of respective left and right optical modules 40. Nose region 56 may be interposed between eye regions 54 and may be configured to overlap the nose bridge of the user when device 10 is mounted on the user's head.

If desired, fabric 62 of cover 12CC may be a jacquard knit fabric that allows for different zones of fabric to have different features such as different fabric construction, different strand material(s), different stretch capabilities, different opacity levels, etc. For example, nose region 56 may be constructed to have a higher opacity and/or lower stretch capability than eye regions 54. For example, to reduce stretch in nose region 56 relative to eye regions 54, zig-zag strands 46 may be omitted from fabric 62 in region 56 and may only be present in eye regions 54. Additionally or alternatively, strands in nose region 56 may be mostly or entirely formed from less-stretchable material such as polyester instead of spandex. More textured yarns may be present in nose region 56 than in eye regions 54 to increase opacity of nose region 56 relative to eye regions 54, if desired.

Figure 11:
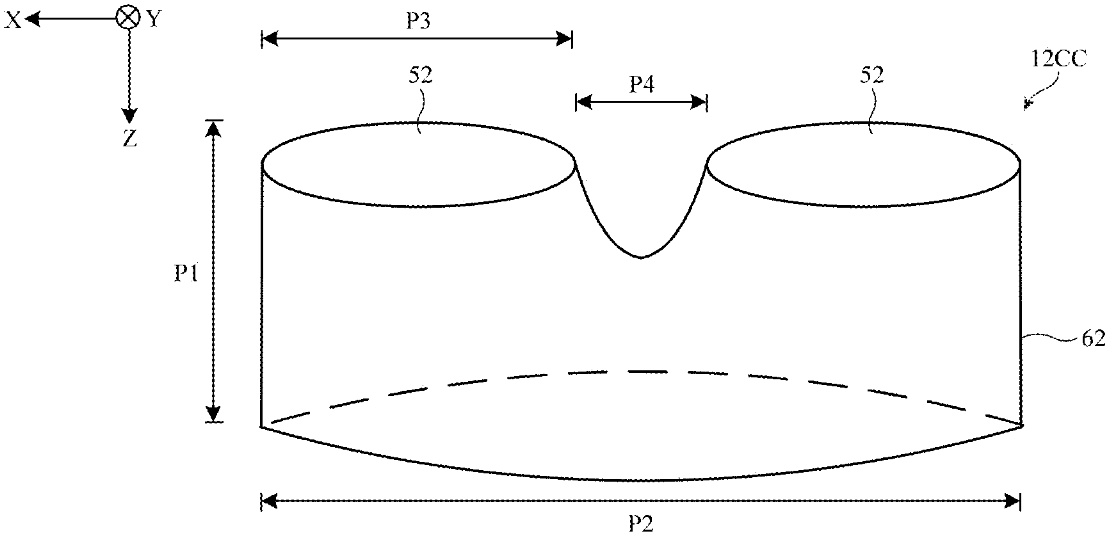
FIG. 11 is a perspective view of an illustrative cover layer formed from a three-dimensional fabric in accordance with an embodiment.

FIG. 11 is a perspective view of an illustrative example in which cover 12CC is formed from three-dimensional fabric 62. Three-dimensional fabric 62 of FIG. 11 may have a fabric construction similar to a pair of pants, where fabric 62 forms left and right cylindrical portions around openings 52. Instead of being mostly flat in the z-direction, fabric 62 may have a non-zero dimension P1 in the z-direction, may have a dimension P2 in the x-direction, with openings 52 having a diameter P3 and separated by a distance P4. With this type of configuration, movement of optical modules 40 may be accommodated by moving the "legs" of fabric 62 around openings 52 towards or away from one another (e.g., moving the left and right cylindrical portions of fabric 62 relative to one another), which involves less stretching of fabric 62 and instead involves moving an entire piece of fabric 62 in a given direction. The use of three-dimensional fabric 62 of FIG. 11 is merely illustrative. If desired, cover 12CC may be formed from a mostly flat fabric 62.

In accordance with an embodiment, a fabric cover for a head-mounted device having first and second lenses is provided that includes first strands that form a warp knit layer having diamond-shaped openings, in which the warp knit layer is configured to stretch in a warp direction; second strands that are interlaced with the first strands and that zig-zag back and forth within the diamond-shaped openings, in which the second strands are configured to stretch in a weft direction; and first and second openings for receiving the respective first and second lenses.

In accordance with another embodiment, the first strands include elastic strands.

In accordance with another embodiment, the second strands include covered strands.

In accordance with another embodiment, the covered strands each include an elastic core and a covering strand.

In accordance with another embodiment, the covering strand includes a drawn textured yarn that increases an opacity within the diamond-shaped openings.

In accordance with another embodiment, the drawn textured yarn includes polyester.

In accordance with another embodiment, the elastic strands each have a first denier value and the elastic core has a second denier value that is less than the first denier value.

In accordance with another embodiment, at least some of the first strands and second strands are dyed at a polymerization level.

In accordance with another embodiment, at least some of the first strands and second strands are dyed at a fabric level.

In accordance with another embodiment, the fabric cover also includes a nose bridge region interposed between the first and second openings, in which the nose bridge region has higher opacity and lower stretch than other portions of the fabric cover.

In accordance with an embodiment, a head-mounted device is provided that includes a housing separating an interior region from an exterior region that surrounds the housing, first and second lenses in the housing that are configured to provide images respectively to first and second eye boxes, and a fabric cover configured to block the interior region from view, in which the fabric cover includes: first and second cover openings that are respectively aligned with the first and second lenses; smooth strands that stretch in a first direction; and textured strands that stretch in a second direction.

In accordance with another embodiment, the textured strands include an elastic core and a fuzzy covering.

In accordance with another embodiment, the smooth strands include warp knit strands.

In accordance with another embodiment, the warp knit strands have a higher denier value than the elastic core.

In accordance with another embodiment, the elastic core is less than 40 denier.

In accordance with another embodiment, the smooth strands form a pattern of openings and the textured strands zig-zig back and forth within the openings.

In accordance with another embodiment, the openings include diamond-shaped openings.

In accordance with another embodiment, the first direction is a warp direction and the second direction is a weft direction.

In accordance with an embodiment, a head-mounted device is provided that includes a housing, left and right lenses supported by the housing, in which the left lens is configured to provide a left image to a left eye box, in which the right lens is configured to provide a right image to a right eye box, and in which the left and right lenses are configured to move relative to each other, and a three-dimensional fabric cover that has a left cylindrical portion that is aligned with the left lens and a right cylindrical portion that is aligned with the right lens, in which the three-dimensional fabric cover is configured to block an interior region of the housing from view and in which the left and right cylindrical portions are configured to move relative to one another in response to movement of the right and left lenses to accommodate different interpupillary distances.

In accordance with another embodiment, the three-dimensional fabric cover includes a nose bridge portion coupled between the first and second cylindrical portions.

The foregoing is merely illustrative and various modifications can be made to the described embodiments. The foregoing embodiments may be implemented individually or in any combination.

What is claimed is:

1. A fabric cover for a head-mounted device having first and second lenses, comprising:
- first strands that form a warp knit layer having diamond-shaped openings, wherein the warp knit layer is configured to stretch in a warp direction;
- second strands that are interlaced with the first strands and that zig-zag back and forth within the diamond- shaped openings, wherein the second strands are configured to stretch in a weft direction; and
- first and second openings for receiving the respective first and second lenses.

2. The fabric cover defined in claim 1 wherein the first strands comprise elastic strands.

3. The fabric cover defined in claim 2 wherein the second strands comprise covered strands.

4. The fabric cover defined in claim 3 wherein the covered strands each comprise an elastic core and a covering strand.

5. The fabric cover defined in claim 4 wherein the covering strand comprises a drawn textured yarn that increases an opacity within the diamond-shaped openings.

6. The fabric cover defined in claim 5 wherein the drawn textured yarn comprises polyester.

7. The fabric cover defined in claim 4 wherein the elastic strands each have a first denier value and the elastic core has a second denier value that is less than the first denier value.

8. The fabric cover defined in claim 1 wherein at least some of the first strands and second strands are dyed at a polymerization level.

9. The fabric cover defined in claim 1 wherein at least some of the first strands and second strands are dyed at a fabric level.

10. The fabric cover defined in claim 1 further comprising:
- a nose bridge region interposed between the first and second openings, wherein the nose bridge region has higher opacity and lower stretch than other portions of the fabric cover.

11. A head-mounted device, comprising:
- a housing separating an interior region from an exterior region that surrounds the housing;
- first and second lenses in the housing that are configured to provide images respectively to first and second eye boxes; and
- a fabric cover configured to block the interior region from view, wherein the fabric cover comprises:
  - first and second cover openings that are respectively aligned with the first and second lenses;
  - smooth strands that stretch in a first direction; and
  - textured strands that stretch in a second direction.

12. The head-mounted device defined in claim 11 wherein the textured strands comprise an elastic core and a fuzzy covering.

13. The head-mounted device defined in claim 12 wherein the smooth strands comprise warp knit strands.

14. The head-mounted device defined in claim 13 wherein the warp knit strands have a higher denier value than the elastic core.

15. The head-mounted device defined in claim 13 wherein the elastic core is less than 40 denier.

16. The head-mounted device defined in claim 11 wherein the smooth strands form a pattern of openings and wherein the textured strands zig-zig back and forth within the openings.

17. The head-mounted device defined in claim 16 wherein the openings comprise diamond-shaped openings.

18. The head-mounted device defined in claim 11 wherein the first direction comprises a warp direction and the second direction comprises a weft direction.

* * * * *